United States Patent
Aoyama

(10) Patent No.: US 8,295,586 B2
(45) Date of Patent: Oct. 23, 2012

(54) POSITION DETECTING METHOD AND POSITION DETECTING APPARATUS IN CONSIDERATION OF NON-PINHOLE CHARACTERISTIC OF A CAMERA

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 12/527,573

(22) PCT Filed: Jan. 25, 2008

(86) PCT No.: PCT/JP2008/051127
§ 371 (c)(1),
(2), (4) Date: Aug. 18, 2009

(87) PCT Pub. No.: WO2008/114531
PCT Pub. Date: Sep. 25, 2008

(65) Prior Publication Data
US 2010/0110176 A1    May 6, 2010

(30) Foreign Application Priority Data
Mar. 22, 2007  (JP) .................... 2007-075465

(51) Int. Cl.
*G06K 9/00* (2006.01)
(52) U.S. Cl. ............. 382/151; 382/154; 702/85; 702/94
(58) Field of Classification Search ............ 702/85, 702/94, 127, 150; 382/151, 154; 356/139.03; 700/56, 58
See application file for complete search history.

(56) References Cited

U.S. PATENT DOCUMENTS

| | | | | |
|---|---|---|---|---|
| 6,594,600 | B1 * | 7/2003 | Arnoul et al. ................. | 702/94 |
| 7,321,838 | B2 * | 1/2008 | Krumm ......................... | 702/94 |
| 7,359,817 | B2 * | 4/2008 | Ban et al. ...................... | 702/94 |
| 7,783,443 | B2 * | 8/2010 | Aratani et al. ................ | 702/94 |
| 2004/0196451 | A1 * | 10/2004 | Aoyama ................. | 356/139.03 |
| 2006/0047472 | A1 * | 3/2006 | Krumm ......................... | 702/150 |
| 2009/0177416 | A1 * | 7/2009 | Nilsagard et al. ............. | 702/41 |

FOREIGN PATENT DOCUMENTS

| | | |
|---|---|---|
| JP | 04-200196 | 7/1992 |
| JP | 2004-309318 | 11/2004 |
| JP | 2001-506369 | 5/2005 |
| JP | 2007-015814 | 1/2007 |
| WO | 99/22281 | 5/1999 |

* cited by examiner

*Primary Examiner* — Frantz Jean
(74) *Attorney, Agent, or Firm* — Squire Sanders (US) LLP

(57) ABSTRACT

A position detection method and a position detection device for detecting with sufficient accuracy the position or the attitude of an object by using an image of the object captured by a single camera. The position detection method detects the position or the attitude of the object by using a measurement pixel position in images of multiple points on the object, which images are captured by the single camera and have a known positional relationship. The method has a step of acquiring, without consideration of non-pinhole camera properties of the camera and based on the positional relationship between the multiple points and on the measurement pixel position, a position matrix representing rotation and translation of the object, a step of obtaining, with consideration of the non-pinhole camera properties of the camera, a correction pixel position corresponding to the measurement pixel position, a step of adjusting the position matrix so that a difference between the correction pixel position and the measurement pixel position is within a permissible range, and a step of defining, as the estimated position of the object, the position corresponding to the adjusted position matrix.

5 Claims, 10 Drawing Sheets

POSITION DETECTING METHOD AND POSITION DETECTING APPARATUS IN CONSIDERATION OF NON-PINHOLE CHARACTERISTIC OF A CAMERA

TECHNICAL FIELD

The present invention relates to a position detecting method and a position detecting apparatus for detecting a position or an attitude of an object from an object image.

BACKGROUND ART

Conventionally, plural cameras are used to take an object image in the position detecting method and position detecting apparatus for detecting the position or attitude of the object from the object image (for example, see Patent Document 1). Accordingly, the drawbacks are a complicated configuration and a large size of the apparatus.

On the other hand, there has also been proposed a position detecting method and a position detecting apparatus for detecting the position or attitude of the object from the object image taken by one camera. However, the position or attitude cannot be detected with a sufficient accuracy.

Patent Document 1: Japanese Patent laid-Open Publication No. 2004-309318

Accordingly, there is a need for the position detecting method and position detecting apparatus for detecting the position or attitude of the object with sufficient accuracy from the object image taken by one camera.

DISCLOSURE OF THE INVENTION

In a position detecting method according to the invention, a position or an attitude of an object is detected from measured pixel positions in an image of a plurality of points on the object in consideration of a non-pinhole characteristic of a camera, the image being taken with one camera, the plurality of points on the object being in a known positional relationship. The position detecting method according to the invention includes the steps of obtaining a position matrix indicating rotation and translation of the object from the measured pixel position and a positional relationship between the plurality of points without considering the non-pinhole characteristic of the camera; and obtaining a corrected pixel position corresponding to one of the measured pixel positions in consideration of the non-pinhole characteristic of the camera. The position detecting method according to the invention includes the steps of adjusting the position matrix such that a distance between the corrected pixel position and the measured pixel position falls within an allowable range; and setting a position corresponding to the position matrix at the object position estimated in consideration of the non-pinhole characteristic of the camera, the position matrix being adjusted such that the distance between the corrected pixel position and the measured pixel position falls within an allowable range.

In the position detecting method according to the invention, the position matrix obtained without considering the non-pinhole characteristic of the camera is adjusted such that the distance between the pixel position corrected in consideration of the non-pinhole characteristic of the camera and the measured pixel position falls within the allowable range, so that the position or attitude of the object can be detected with a sufficient accuracy from the object image taken with one camera.

In the position detecting method according to an embodiment of the invention, an element of the position matrix is adjusted so as to have orthogonality, the element expressing the rotation of the object.

According to the embodiment, the accuracy of object position detection is improved because the orthogonality of the position matrix is ensured.

In the position detecting method according to another embodiment of the invention, correction is performed for the non-pinhole characteristic of the camera using calibration data defined for each pixel position.

According to the embodiment, because the non-pinhole characteristic of the camera is corrected using the calibration data defined for each pixel position, the accuracy of object position detection is improved without complicated procedure.

A position detecting apparatus according to the invention that detects a position or an attitude of an object, includes image obtaining means for obtaining an image of a plurality of points on the object, the image being taken with one camera, the plurality of points being in a known positional relationship; pixel position detecting means for detecting measured pixel positions of the plurality of points in the image; and object position estimating means for detecting the object position from the measured pixel positions of the plurality of points and a positional relationship between the plurality of points. The object position estimating means obtains a position matrix indicating rotation and translation of the object from the measured pixel positions and a positional relationship between the plurality of points without considering the non-pinhole characteristic of the camera, and obtains a corrected pixel position corresponding to one of the measured pixel positions in consideration of the non-pinhole characteristic of the camera. The object position estimating means adjusts the position matrix such that a distance between the corrected pixel position and the measured pixel position falls within an allowable range, and sets a position corresponding to the position matrix at the object position estimated in consideration of the non-pinhole characteristic of the camera, the position matrix being adjusted such that the distance between the corrected pixel position and the measured pixel position falls within an allowable range.

In the position detecting apparatus according to the invention, the object position estimating means adjusts the position matrix obtained without considering the non-pinhole characteristic of the camera such that the distance between the pixel position corrected in consideration of the non-pinhole characteristic of the camera and the measured pixel position falls within the allowable range, so that the position or attitude of the object can be detected with a sufficient accuracy from the object image taken with one camera.

The position detecting apparatus according to an embodiment of the invention further includes calibration data storage means in which calibration data defined for each pixel position is stored, and the object position estimating means performs correction for the non-pinhole characteristic of the camera using the calibration data.

Thus, because correction is performed for the non-pinhole characteristic of the camera using the calibration data stored in the calibration data storage means, the accuracy of object position detection is improved with no complicated procedure.

BEST MODE FOR CARRYING OUT THE INVENTION

Figure 1:
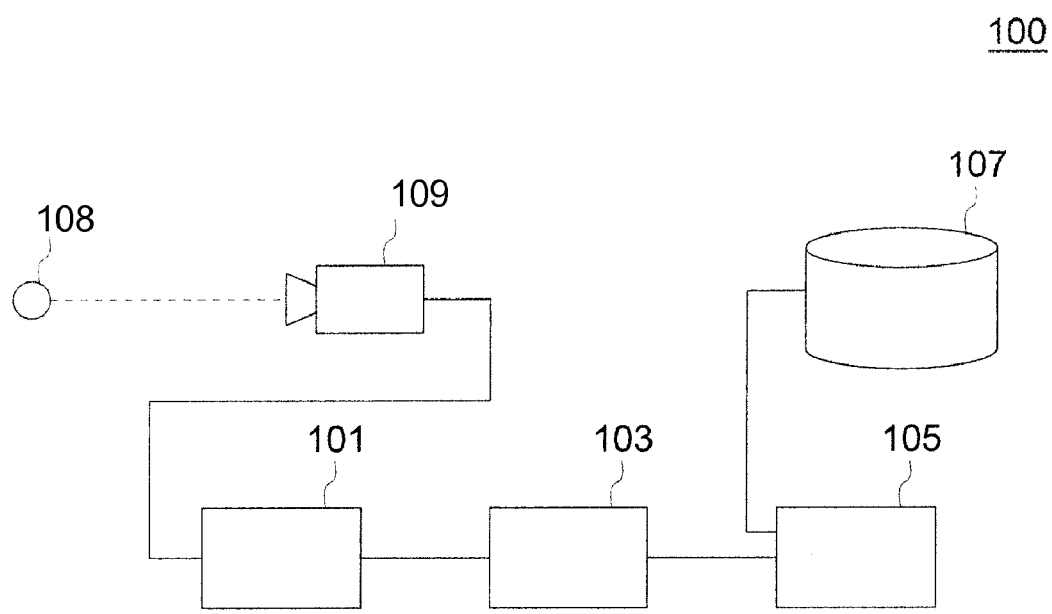
FIG. 1 is a view illustrating a configuration of a position detecting apparatus according to an embodiment of the invention.

FIG. 1 is a view illustrating a configuration of a position detecting apparatus 100 according to an embodiment of the invention. The position detecting apparatus 100 includes image obtaining means 101, pixel position detecting means 103, object position estimating means 105, and calibration data storage means 107.

The image obtaining means 101 obtains and stores an image of positions of plural points on an object. The image of positions is taken by one camera 109. At this point, the plural points are in a known positional relationship. Markers 108 may be added the plural points so that an image of the markers can be taken.

The pixel position detecting means 103 detects pixel positions of the plural points in the image obtained by the image obtaining means 101.

The calibration data storage means 107 stores calibration data corresponding to the pixel positions therein.

The object position estimating means 105 estimates an object position using the pixel positions of the plural points and the pieces of calibration data corresponding to the pixel positions.

Figure 2:
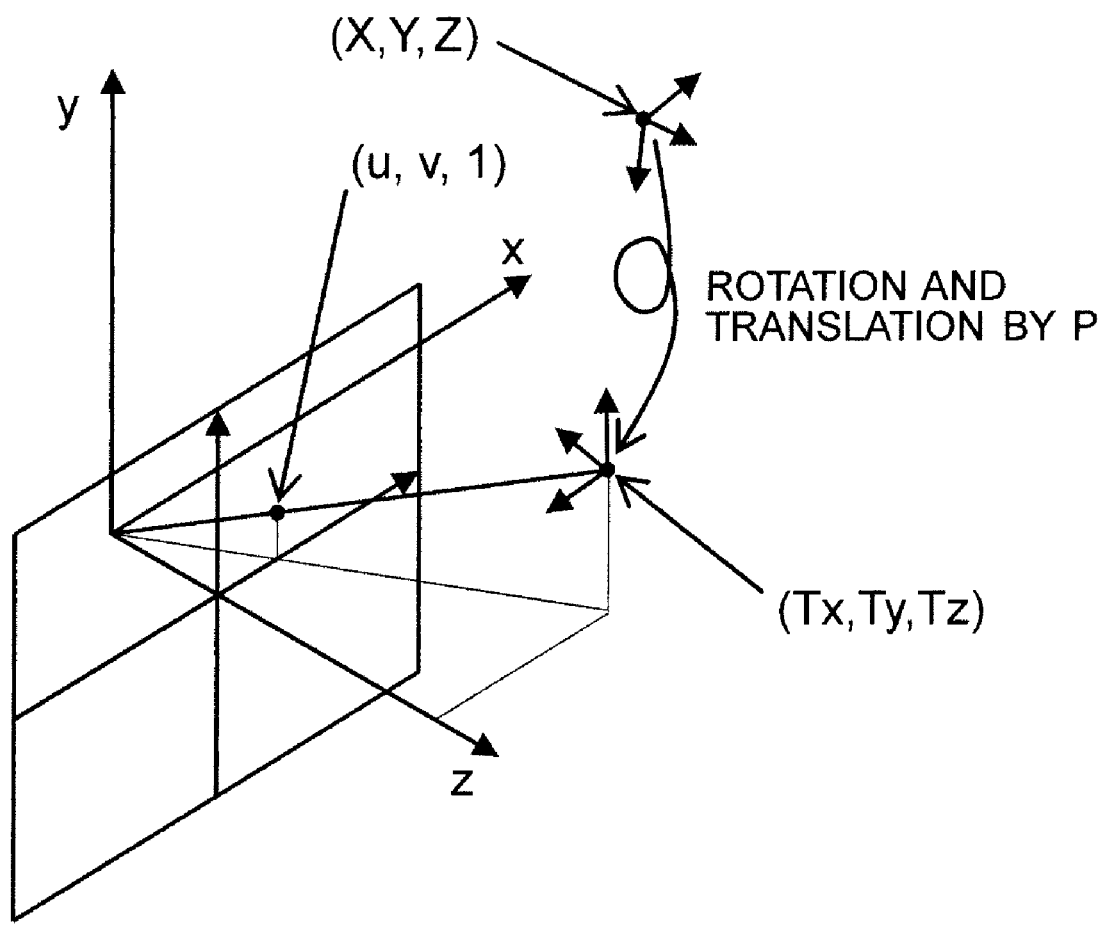
FIG. 2 is a view illustrating a relationship between a position (X,Y,Z) on an object and a position on an image, that is, a pixel position (u,v,1).

FIG. 2 is a view illustrating a relationship between a position (X,Y,Z) on the object and a position on the image, that is, a pixel position (u,v,1).

The transform of the position (X,Y,Z) on the object into the position (u,v,1) on the image is expressed as follows while divided into a position matrix P indicating rotation and translation of the object and a projection transform matrix w.

$$P = \begin{pmatrix} P_{11} & P_{12} & P_{13} & P_{14} \\ P_{21} & P_{22} & P_{23} & P_{24} \\ P_{31} & P_{32} & P_{33} & P_{34} \end{pmatrix}$$ [Formula 1]

$$\begin{pmatrix} T_x \\ T_y \\ T_z \end{pmatrix} = P \begin{pmatrix} X \\ Y \\ Z \\ 1 \end{pmatrix}$$

$$w \begin{pmatrix} u \\ v \\ 1 \end{pmatrix} = \begin{pmatrix} T_x \\ T_y \\ T_z \end{pmatrix}$$

When an initial position and an attitude of the object are matched with a position and an attitude of the camera, the position matrix P indicates the position and attitude of the object. Accordingly, the object position can be estimated by obtaining the position matrix P.

The object position estimating means 105 obtains the position matrix P to estimate the object position. A function of the object position estimating means 105 will be described below.

Method for Obtaining Position Matrix

First a method for obtaining the position matrix P will be described. Assuming that the projection transform matrix w and the position matrix P are expressed by Formulas 2 and 3, Formula 4 is obtained.

$$w \begin{pmatrix} u \\ v \\ 1 \end{pmatrix} = P \begin{pmatrix} X \\ Y \\ Z \\ 1 \end{pmatrix}$$ [Formula 2]

$$P = \begin{pmatrix} P_{11} & P_{12} & P_{13} & P_{14} \\ P_{21} & P_{22} & P_{23} & P_{24} \\ P_{31} & P_{32} & P_{33} & P_{34} \end{pmatrix}$$

$$= P_{34} \begin{pmatrix} \frac{P_{11}}{P_{34}} & \frac{P_{12}}{P_{34}} & \frac{P_{13}}{P_{34}} & \frac{P_{14}}{P_{34}} \\ \frac{P_{21}}{P_{34}} & \frac{P_{22}}{P_{34}} & \frac{P_{23}}{P_{34}} & \frac{P_{23}}{P_{34}} \\ \frac{P_{31}}{P_{34}} & \frac{P_{32}}{P_{34}} & \frac{P_{33}}{P_{34}} & 1 \end{pmatrix}$$

$$= P_{34} \begin{pmatrix} a_{11} & a_{12} & a_{13} & a_{14} \\ a_{21} & a_{22} & a_{23} & a_{24} \\ a_{31} & a_{32} & a_{33} & 1 \end{pmatrix}$$

$$\frac{w}{P_{34}} = W$$ [Formula 3]

$$W \begin{pmatrix} u \\ v \\ 1 \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & 1 \end{pmatrix} \begin{pmatrix} X \\ Y \\ Z \\ 1 \end{pmatrix}$$ [Formula 4]

Formula 4 is expressed as follows:

$$Wu = a_{11}X + a_{12}Y + a_{13}Z + a_{14}$$

$$Wv = a_{21}X + a_{22}Y + a_{23}Z + a_{24}$$

$$W = a_{31}X + a_{32}Y + a_{33}Z + 1$$ [Formula 5]

When W is substituted into the equations including u and v, Formula 6 is obtained.

$$u = \frac{a_{11}X + a_{12}Y + a_{13}Z + a_{14}}{a_{31}X + a_{32}Y + a_{33}Z + 1}$$ [Formula 6]

$$v = \frac{a_{21}X + a_{22}Y + a_{23}Z + a_{24}}{a_{31}X + a_{32}Y + a_{33}Z + 1}$$

At this point, because Formula 7 is known by the measurement, the number of unknowns becomes 11 as illustrated by Formula 8.

$$X, Y, Z, u, v$$ [Formula 7]

$$a_{11}, a_{12}, a_{13}, a_{14}, a_{21}, a_{22}, a_{23}, a_{24}, a_{31}, a_{32}, a_{33}$$ [Formula 8]

However, the unknowns expressed by Formula 9 are orthogonal.

$$a_{11}, a_{12}, a_{13}, a_{21}, a_{22}, a_{23}, a_{31}, a_{32}, a_{33}$$ [Formula 9]

A linear equation relating to a is expressed by Formula 10.

$$Xa_{11} + Ya_{12} + Za_{13} + a_{14} - uXa_{31} - uYa_{32} - uZa_{33} = u$$

$$Xa_{21} + Ya_{22} + Za_{21} + a_{24} - vXa_{31} - vYa_{32} - vZa_{33} = v$$ [Formula 10]

At this point, assuming that the point (X,Y,Z) is located on a plane of Z=0, because Formula 11 is obtained, the number of unknowns becomes eight as illustrated by Formula 12, and the eight unknowns can be determined from numerical values of (X,Y) and (u,v) for four points.

$$Xa_{11} + Ya_{12} + a_{14} - uXa_{31} - uYa_{32} = u$$

$$Xa_{21} + Ya_{22} + a_{24} - vXa_{31} - vYa_{32} = v$$ [Formula 11]

$$a_{11}, a_{12}, a_{14}, a_{21}, a_{22}, a_{24}, a_{31}, a_{32}$$ [Formula 12]

Assuming that the three-dimensional coordinates at the four point and the two-dimensional coordinates on the screen are projected as illustrated by Formula 13, Formula 15 can be obtained by solving Formula 14.

$$(X_1, Y_1, 0) \rightarrow (u_1, v_1)$$

$$(x_2, Y_2, 0) \rightarrow (u_2, v_2)$$

$$(X_3, Y_3, 0) \rightarrow (u_3, v_3)$$

$$(X_4, Y_4, 0) \rightarrow (u_4, v_4)$$ [Formula 13]

$$\begin{pmatrix} u_1 \\ v_1 \\ u_2 \\ v_2 \\ u_3 \\ v_3 \\ u_4 \\ v_4 \end{pmatrix} = \begin{pmatrix} X_1 & Y_1 & 1 & 0 & 0 & 0 & -u_1X_1 & -u_1Y_1 \\ 0 & 0 & 0 & X_1 & Y_1 & 1 & -v_1X_1 & -v_1Y_1 \\ X_2 & Y_2 & 1 & 0 & 0 & 0 & -u_2X_2 & -u_2Y_2 \\ 0 & 0 & 0 & X_2 & Y_2 & 1 & -v_2X_2 & -v_2Y_2 \\ X_3 & Y_3 & 1 & 0 & 0 & 0 & -u_3X_3 & -u_3Y_3 \\ 0 & 0 & 0 & X_3 & Y_3 & 1 & -v_3X_3 & -v_3Y_3 \\ X_4 & X_4 & 1 & 0 & 0 & 0 & -u_4X_4 & -u_4Y_4 \\ 0 & 0 & 0 & X_4 & Y_4 & 1 & -v_4X_4 & -v_4Y_4 \end{pmatrix} \begin{pmatrix} a_{11} \\ a_{12} \\ a_{14} \\ a_{21} \\ a_{22} \\ a_{24} \\ a_{31} \\ a_{32} \end{pmatrix}$$ [Formula 14]

$$a_{11}, a_{12}, a_{14}, a_{21}, a_{22}, a_{24}, a_{31}, a_{32}$$ [Formula 15]

Formula 16 is obtained from Formula 17 because of orthogonality.

$$a_{13}, a_{23}, a_{33}$$ [Formula 16]

$$a_{11}, a_{12}, a_{14}, a_{21}, a_{22}, a_{24}, a_{31}, a_{32}$$ [Formula 17]

Formula 18 is obtained from Formula 20 by using Formula 19.

$$P_{34}$$ [Formula 18]

$$\sqrt{a_{11}^2 + a_{12}^2 + a_{13}^2} = \sqrt{a_{21}^2 + a_{22}^2 + a_{23}^2} = \frac{1}{P_{34}}$$ [Formula 19]

$$P_{34} = \frac{2}{\sqrt{a_{11}^2 + a_{12}^2 + a_{13}^2} + \sqrt{a_{21}^2 + a_{22}^2 + a_{23}^2}}$$ [Formula 20]

The position matrix P indicating the position and attitude is determined by the above-described procedure. However, as can be seen from the above-described procedure, the unknowns expressed by Formula 21 have no relation with one another, the orthogonality is not ensured.

$$a_{11}, a_{12}, a_{14}, a_{21}, a_{22}, a_{24}, a_{31}, a_{32}$$ [Formula 21]

Method for Obtaining Position Matrix Having Orthogonality

A method for obtaining the position matrix having the orthogonality will be described below.

A rotation angle θ is obtained from the obtained position matrix P. Because the angle is obtained from partial values, the angle is not an optimum angle. Therefore, the obtained angle and translation component are set at initial values, and the optimum angle and translation component are obtained by non-linear minimization.

Formula 22 is obtained when the object is rotated in the order of θz→θx→θy (−180<θz≦180, −90<θx≦90, −180<θy≦180).

$$P = \begin{pmatrix} P_{11} & P_{12} & P_{13} & P_{14} \\ P_{21} & P_{22} & P_{23} & P_{24} \\ P_{31} & P_{32} & P_{33} & P_{34} \end{pmatrix}$$

$$= \begin{pmatrix} \cos\theta_y\cos\theta_z + \sin\theta_x\sin\theta_y\sin\theta_z & -\cos\theta_y\sin\theta_z + \sin\theta_x\sin\theta_y\cos\theta_z & \cos\theta_x\sin\theta_y & P_{14} \\ \cos\theta_x\sin\theta_z & \cos\theta_x\cos\theta_z & -\sin\theta_x & P_{24} \\ -\sin\theta_y\cos\theta_z + \sin\theta_x\cos\theta_y\sin\theta_z & \sin\theta_y\sin\theta_z + \sin\theta_x\cos\theta_y\cos\theta_z & \cos\theta_x\cos\theta_y & P_{34} \end{pmatrix}$$ [Formula 22]

Therefore, the relationship between the position matrix P and the rotation angle is obtained by Formula 23 in the case of θx≠90.

$$\theta_x = \sin^{-1}(-P_{23})$$ [Formula 23]

$$\theta_y = \tan^{-1}\frac{P_{31}}{P_{33}}$$

$$\theta_z = \tan^{-1}\frac{P_{21}}{P_{22}}$$

In the case of θx=90, Formula 24 is obtained when θy=0.

$$\theta_x = \sin^{-1}(-P_{23})$$ [Formula 24]

$$\theta_y = 0$$

$$\theta_z = \tan^{-1}\left(-\frac{P_{12}}{P_{11}}\right)$$

When a position matrix Po is formed based on the rotation angle obtained by the equations, Po has the orthogonality.

At this point, the angle is obtained only from $P_{21}$, $P_{22}$, $P_{23}$, $P_{31}$, $P_{33}$ or $P_{11}$, $P_{12}$, $P_{23}$. Accordingly, the projection result onto the screen with the position matrix Po is different from the projection result onto the screen with the position matrix P. Therefore, these angles are set at the initial values, and the angle θ is finely adjusted such that the error between the position at the projected point and the pixel position on the image is minimized, whereby the error is minimized while the orthogonality is maintained.

It is assumed that the four points are projected as expressed in Formula 25 by the position matrix Po.

$$(X_1, Y_1, 0) \rightarrow (u'_1, v'_1)$$

$$(X_2, Y_2, 0) \rightarrow (u'_2, v'_2)$$

$$(X_3, Y_3, 0) \rightarrow (u'_3, v'_3)$$

$$(X_4, Y_4, 0) \rightarrow (u'_4, v'_4) \quad \text{[Formula 25]}$$

At this point, the sum of squares of a distance between the position at the point onto which the error E is projected and the pixel position on the image is expressed by Formula 26:

$$E = \sum_i ((u'_i - u_i)^2 + (v'_i - v_i)^2) \quad \text{[Formula 26]}$$

θx, θy, θz and $P_{34}$ are adjusted by a gradient technique such that the error E becomes the minimum.

$P_{14}$ and $P_{24}$ are not changed because $P_{14}$ and $P_{24}$ are redundant as described later. Thus, the position matrix P can be transformed into the matrix having the orthogonality.

The position matrix P can also be expressed in the form in which a matrix R having an element of an infinitesimal rotation angle Δθ is separated.

$$P = \begin{pmatrix} P_{11} & P_{12} & P_{13} & P_{14} \\ P_{21} & P_{22} & P_{23} & P_{24} \\ P_{31} & P_{32} & P_{33} & P_{34} \end{pmatrix} \quad \text{[Formula 27]}$$

$$= \begin{pmatrix} \cos\theta_y\cos\theta_z + \sin\theta_x\sin\theta_y\sin\theta_z & -\cos\theta_y\sin\theta_z + \sin\theta_x\sin\theta_y\cos\theta_z & \cos\theta_x\sin\theta_y & P_{14} \\ \cos\theta_x\sin\theta_z & \cos\theta_x\cos\theta_z & -\sin\theta_x & P_{24} \\ -\sin\theta_y\cos\theta_z + \sin\theta_x\cos\theta_y\sin\theta_z & \sin\theta_y\sin\theta_z + \sin\theta_x\cos\theta_y\cos\theta_z & \cos\theta_x\cos\theta_y & P_{34} \end{pmatrix}$$

$$= R \cdot P'$$

$$= \begin{pmatrix} \cos\Delta\theta_y\cos\Delta\theta_z + \sin\Delta\theta_x\sin\Delta\theta_y\sin\Delta\theta_z & -\cos\Delta\theta_y\sin\Delta\theta_z + \sin\Delta\theta_x\sin\Delta\theta_y\cos\Delta\theta_z & \cos\Delta\theta_x\sin\Delta\theta_y \\ \cos\Delta\theta_x\sin\Delta\theta_z & \cos\Delta\theta_x\cos\Delta\theta_z & -\sin\Delta\theta_x \\ -\sin\Delta\theta_y\cos\Delta\theta_z + \sin\Delta\theta_x\cos\Delta\theta_y\sin\Delta\theta_z & \sin\Delta\theta_y\sin\Delta\theta_z + \sin\Delta\theta_x\cos\Delta\theta_y\cos\Delta\theta_z & \cos\Delta\theta_x\cos\Delta\theta_y \end{pmatrix}$$

$$\begin{pmatrix} \cos\theta'_y\cos\theta'_z + \sin\theta'_x\sin\theta'_y\sin\theta'_z & -\cos\theta'_y\sin\theta'_z + \sin\theta'_x\sin\theta'_y\cos\theta'_z & \cos\theta'_x\sin\theta'_y & P_{14} \\ \cos\theta'_x\sin\theta'_z & \cos\theta'_x\cos\theta'_z & -\sin\theta'_x & P_{24} \\ -\sin\theta'_y\cos\theta'_z + \sin\theta'_x\cos\theta'_y\sin\theta'_z & \sin\theta'_y\sin\theta'_z + \sin\theta'_x\cos\theta'_y\cos\theta'_z & \cos\theta'_x\cos\theta'_y & P_{34} \end{pmatrix}$$

Since cos θ 1 and sin θ θ in the case of Δθ<<1, Formula 28 is obtained.

$$P = \begin{pmatrix} 1 & -\Delta\theta_z & \Delta\theta_y \\ \Delta\theta_z & 1 & -\Delta\theta_x \\ -\Delta\theta_y & \Delta\theta_x & 1 \end{pmatrix} \quad \text{[Formula 28]}$$

$$\begin{pmatrix} \cos\theta'_y\cos\theta'_z + \sin\theta'_x\sin\theta'_y\sin\theta'_z & -\cos\theta'_y\sin\theta'_z + \sin\theta'_x\sin\theta'_y\cos\theta'_z & \cos\theta'_x\sin\theta'_y & P_{14} \\ \cos\theta'_x\sin\theta'_z & \cos\theta'_x\cos\theta'_z & -\sin\theta'_x & P_{24} \\ -\sin\theta'_y\cos\theta'_z + \sin\theta'_x\cos\theta'_y\sin\theta'_z & \sin\theta'_y\sin\theta'_z + \sin\theta'_x\cos\theta'_y\cos\theta'_z & \cos\theta'_x\cos\theta'_y & P_{34} \end{pmatrix}$$

Hereinafter the transformed position matrix is referred to as position matrix P.

In the above-described matrix, the error E may be minimized by adjusting Δθx, Δθy, Δθz and $P_{14}$, $P_{24}$, $P_{34}$.

As can be seen from the matrix R, Δθx and Δθy becomes the translation component during the infinitesimal rotation, changing the elements $P_{14}$ and $P_{24}$ of the translation is redundant and becomes an obstacle of convergence. Therefore, the elements $P_{14}$ and $P_{24}$ are not changed. That is, the error E is minimized by adjusting Δθx, Δθy, Δθz, and $P_{34}$.

Non-Pinhole Characteristic Correcting Method

A non-pinhole characteristic correcting method performed by the object position estimating means 105 will be described below.

The pinhole characteristic means a characteristic in which, in the camera, all the incident rays pass through a pinhole at one point to form the image. The method for obtaining the position matrix to estimate the object position is based on the pinhole characteristic of the camera. However, the light actually incident to the camera does not have the pinhole characteristic, but does have a non-pinhole characteristic because the light passes through a lens.

Figure 4:
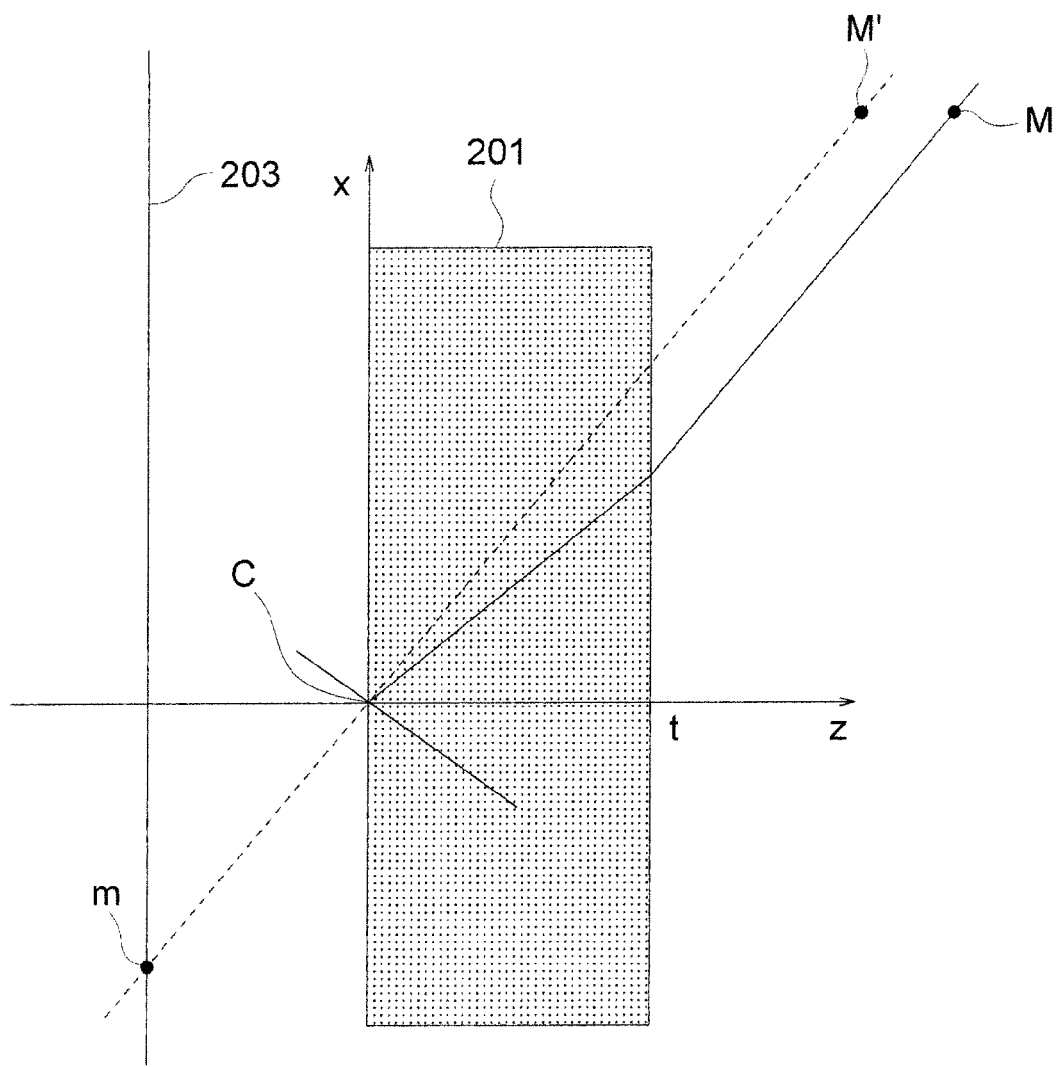
FIG. 4 is a view for explaining the non-pinhole characteristic of the camera.

FIG. 4 is a view for explaining the non-pinhole characteristic of the camera. For the sake of simple explanation, a glass plate 201 is used instead of the lens. Referring to FIG. 4, the glass plate 201 having a thickness t is placed on the object side of a pinhole C. The light from a point M on the object is refracted by the glass plate 201, and the light is projected onto a point m on a screen 203 after passing through the pinhole C. The position of the point m corresponds to the measured pixel position.

Because the method for estimating the object position by obtaining the position matrix is based on the pinhole characteristic of the camera, it is determined that the point M is a position of a point M' on a straight line connecting the point m and the pinhole C. Accordingly, when the object position is estimated without considering the non-pinhole characteristic of the camera, the error is generated due to the position distance between the point M and the point M'.

A method for obtaining the object position estimated in consideration of the non-pinhole characteristic of the camera will be described below.

Figure 3:
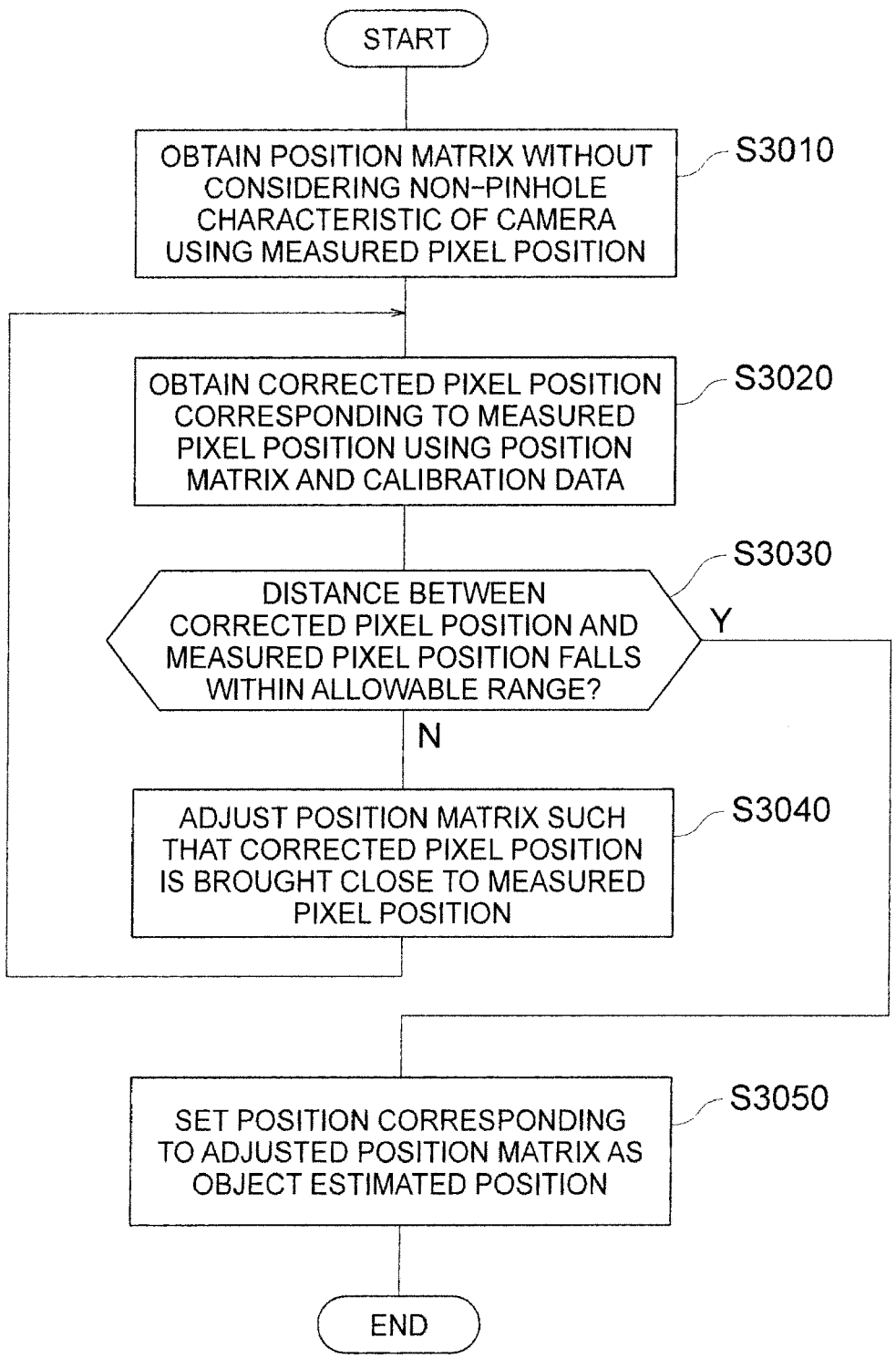
FIG. 3 is a flowchart illustrating a method in which object position estimating means obtains an object position estimated in consideration of a non-pinhole characteristic of a camera.

FIG. 3 is a flowchart illustrating the method in which the object position estimating means 105 obtains the object position estimated in consideration of the non-pinhole characteristic of the camera.

In Step S3010 of FIG. 3, the object position estimating means 105 obtains the position matrix P indicating the rotation and translation of the object from the plural points on the object that are in the known positional relationship without considering the non-pinhole characteristic of the camera. The estimation is performed using the positional relationship and the measured pixel positions in the image of the plural points. The method for obtaining the position matrix P is already described in the "method for obtaining position matrix having orthogonality". The position matrix that is obtained without considering the non-pinhole characteristic of the camera corresponds to the position of the point M' of FIG. 4.

In Step S3020 of FIG. 3, the object position estimating means 105 obtains calibration data corresponding to the measured pixel position (position of m). The calibration data is stored in the calibration data storage means 107. Then the object position estimating means 105 obtains a corrected pixel position using the position matrix P and the calibration data.

The calibration data in which the characteristic of the non-pinhole camera is digitized will be described below.

Figure 10:
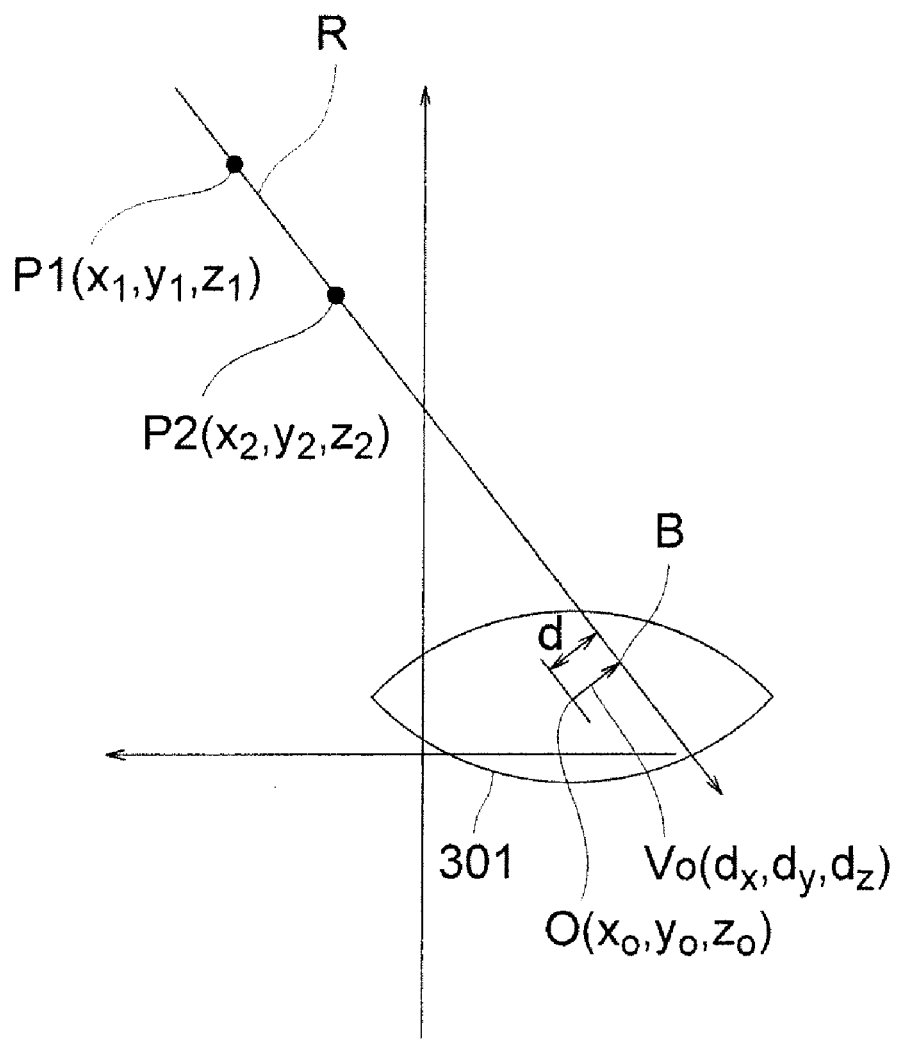
FIG. 10 is an explanatory view for explaining contents of calibration data.

FIG. 10 is an explanatory view for explaining contents of the calibration data. As illustrated in FIG. 10, an incident ray R incident to a lens 1 can be specified at two points. At this point, when light emitted from a first light source position P1 and light emitted from a second light source position P2 are taken by the same imaging pixel (not illustrated), it is specified that the incident ray R is an incident ray corresponding to the imaging pixel.

It is defined that an optical center O is a point at which the sum of squares of the distances with all the incident rays becomes the minimum, and it is defined that an incident light base point B of the incident ray R is a point at which the distance between the incident ray R corresponding to each imaging pixel and the optical center O becomes the minimum.

That is, in all the incident rays, the optical center $O(x_0,y_0,z_0)$ is the position at which the sum of squares (Equation (1)) of a distance d from the incident ray R specified by the light source position $P1(x_1,y_1,z_1)$ and the light source position $P2(x_2,y_2,z_2)$ becomes the minimum. The optical point is obtained by a least square method.

$$d^2=-(A^2/B)+C \quad (1)$$

In Equation (1), $$A=(x_2-x_1)(x_1-x_0)+(y_2-y_1)(y_1-y_0)+(z_2-z_1)(z_1-z_0)$$

$$B=(x_2-x_1)^2+(y_2-y_1)^2+(z_2-z_1)^2$$

$$C=(x_1-x_0)^2+(y_1-y_0)^2+(z_1-z_0)^2$$

Therefore, the data in which a direction specified by the light source positions P1 and P2 and a deviation amount (expressed by three-dimensional vector $V_D$ (dx,dy,dz)) from the optical center O to the incident light base point B are correlated to each other is set to the calibration data at each pixel position, which allows the characteristic of the non-pinhole camera to be digitized.

The calibration data is not limited to this. For example, in the above-described embodiment, the optical center O is set at the reference position, and a vector from the reference position to a foot of the perpendicular dropped from the optical center O to the incident ray is set at the deviation amount $V_D$. The reference position is not limited to the optical center, but any fixed point may be set at the reference position as long as the fixed point has a constant relationship with the camera. The deviation amount $V_D$ is not limited to the vector from the reference position to the foot of the perpendicular dropped from the optical center O to the incident ray, but a vector from the reference position toward an arbitrary one point on the incident ray may be used as the deviation amount $V_D$.

In the embodiment, the pinhole is set at the reference position, and the base point is expressed by B.

Thus, the calibration data is the data in which the direction of the incident ray R and the deviation amount from the reference position to the base point are correlated with the pixel position, and the calibration data can be obtained by the measurement. The calibration data for each pixel position obtained by the measurement is stored in the calibration data table 107.

Figure 5:
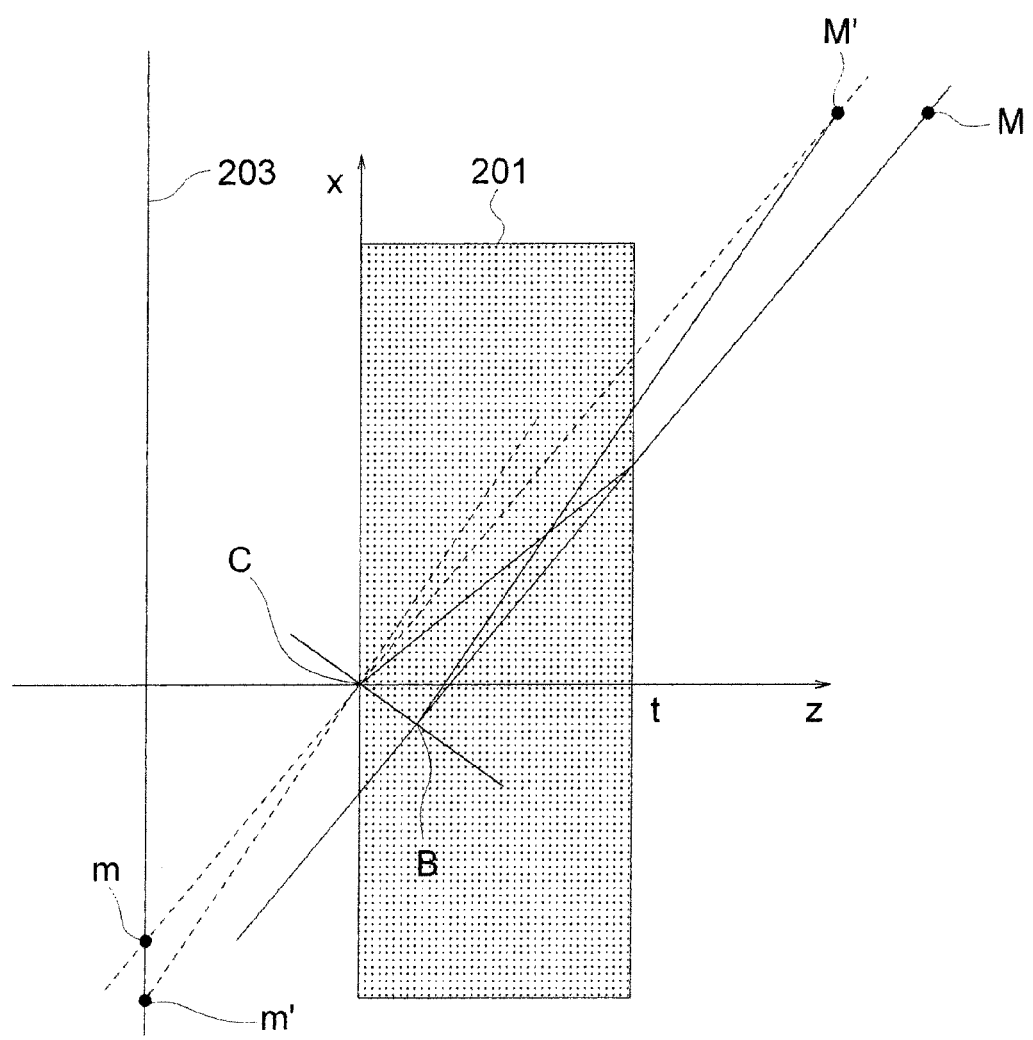
FIG. 5 is a view for explaining a method for obtaining a corrected pixel position through a first correction.

FIG. 5 is a view for explaining a method for obtaining the corrected pixel position (hereinafter referred to as corrected pixel position 1, position of m') through a first correction. A base point position (position of B) is obtained from the calibration data corresponding to the measured pixel position (position of m). Then a straight line connecting the base point position (position of B) and the point M' is obtained. The point M' is obtained from the position matrix P. A straight line that is parallel to the straight line connecting the base point position (position of B) and the point M' and passes through the pinhole position (position of C) is obtained, and an intersection point of the straight line with the screen 203 is set at the corrected pixel position (position of m').

In Step S3030, the object position estimating means 105 determines whether or not the distance between the corrected pixel position (position of m') and the measured pixel position (position of m) falls within an allowable range. For example, the allowable range is set at ±0.05 pixel. When the distance does not fall within the allowable range, the flow goes to Step S3040. When the distance falls within the allowable range, the flow goes to Step S3050.

In Step S3040 of FIG. 3, the object position estimating means 105 adjusts the position matrix such that the corrected pixel position is brought close to the measured pixel position.

Figure 6:
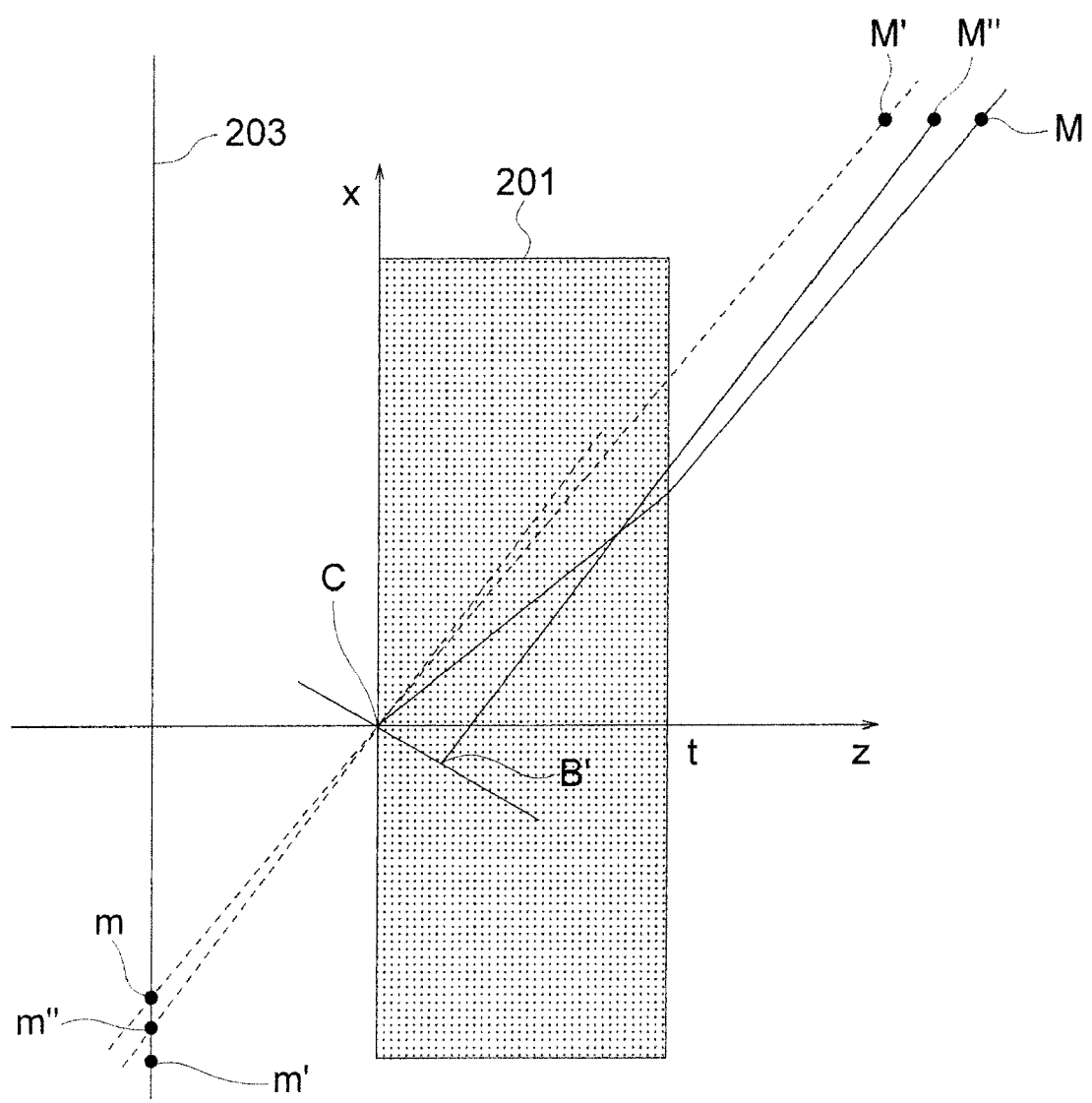
FIG. 6 is a view for explaining a method for obtaining a corrected pixel position through a second correction.

FIG. 6 is a view for explaining a method for obtaining the corrected pixel position (hereinafter referred to as corrected pixel position 2, position of m") through a second correction. Because the corrected pixel position 1 (position of m') is located below the measured pixel position (position of m), it is necessary that the corrected pixel position be moved upward (direction in which the X-coordinate is increased). Therefore, for example, the point M' is moved rightward (direction in which the Z-coordinate is increased). Specifically, $\Delta\theta x$, $\Delta\theta y$, $\Delta\theta z$, and $P_{34}$ of the position matrix P are adjusted to move the point M' rightward (direction in which the Z-coordinate is increased), thereby obtaining the point M".

After the processing in Step S3040 is performed, the object position estimating means 105 performs the processing in Step S3020.

The processing in Step S3020 will be described with reference to FIG. 6. A base point position (position of B') is obtained from the calibration data corresponding to the corrected pixel position 1 (position of m'). Then a straight line connecting the base point position (position of B') and the point M" is obtained. The point M" is obtained from the adjusted position matrix P as described above. A straight line that is parallel to the straight line connecting the base point position (position of B') and the point M" and passes through the pinhole position (position of C), and an intersection point of the straight line with the screen 203 is set at the corrected pixel position 2 (position of m").

Similarly the object position estimating means 105 repeats the processing in Steps S3040 and S3020 until the distance between the corrected pixel position and the measured pixel position (position of m) falls within the allowable range.

In the repetitive computation, an adjustment amount of the position matrix P is obtained in consideration of the movement amount of the corrected pixel position with respect to the adjustment amount of the position matrix P.

Figure 7:
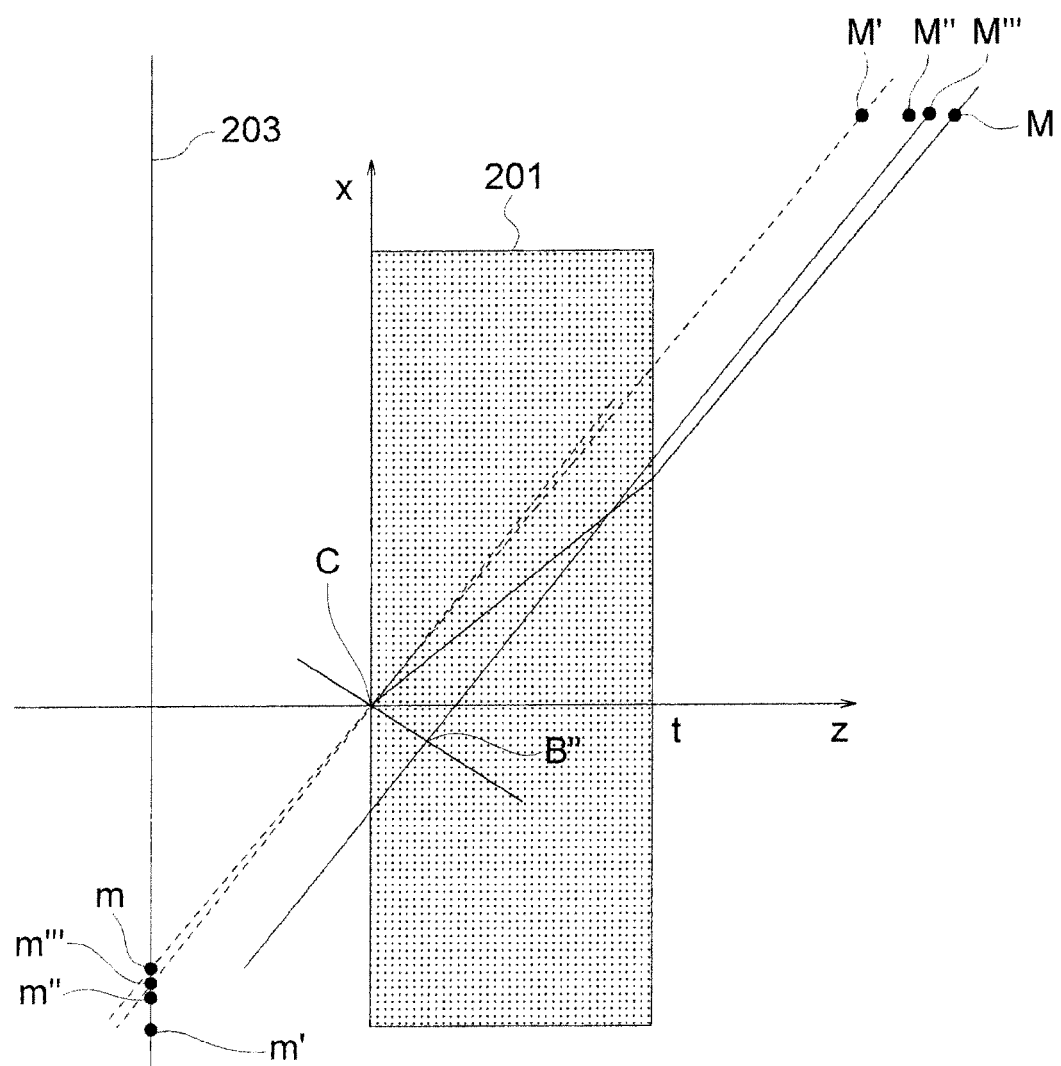
FIG. 7 is a view for explaining a method for obtaining a corrected pixel position through a third correction.

FIG. 7 is a view for explaining a method for obtaining a corrected pixel position (hereinafter referred to as corrected pixel position 3, position of m''') through a third correction. The distance between the corrected pixel position 3 (position of m''') and the measured pixel position (position of m) falls within the allowable range.

In Step S3050, the object position estimating means 105 sets the position corresponding to the position matrix P at the object position estimated in consideration of the non-pinhole characteristic of the camera. The position corresponding to the position matrix P is adjusted such that the distance between the corrected pixel position (position of m''') and the measured pixel position (position of m) falls within the allowable range.

Figure 8:
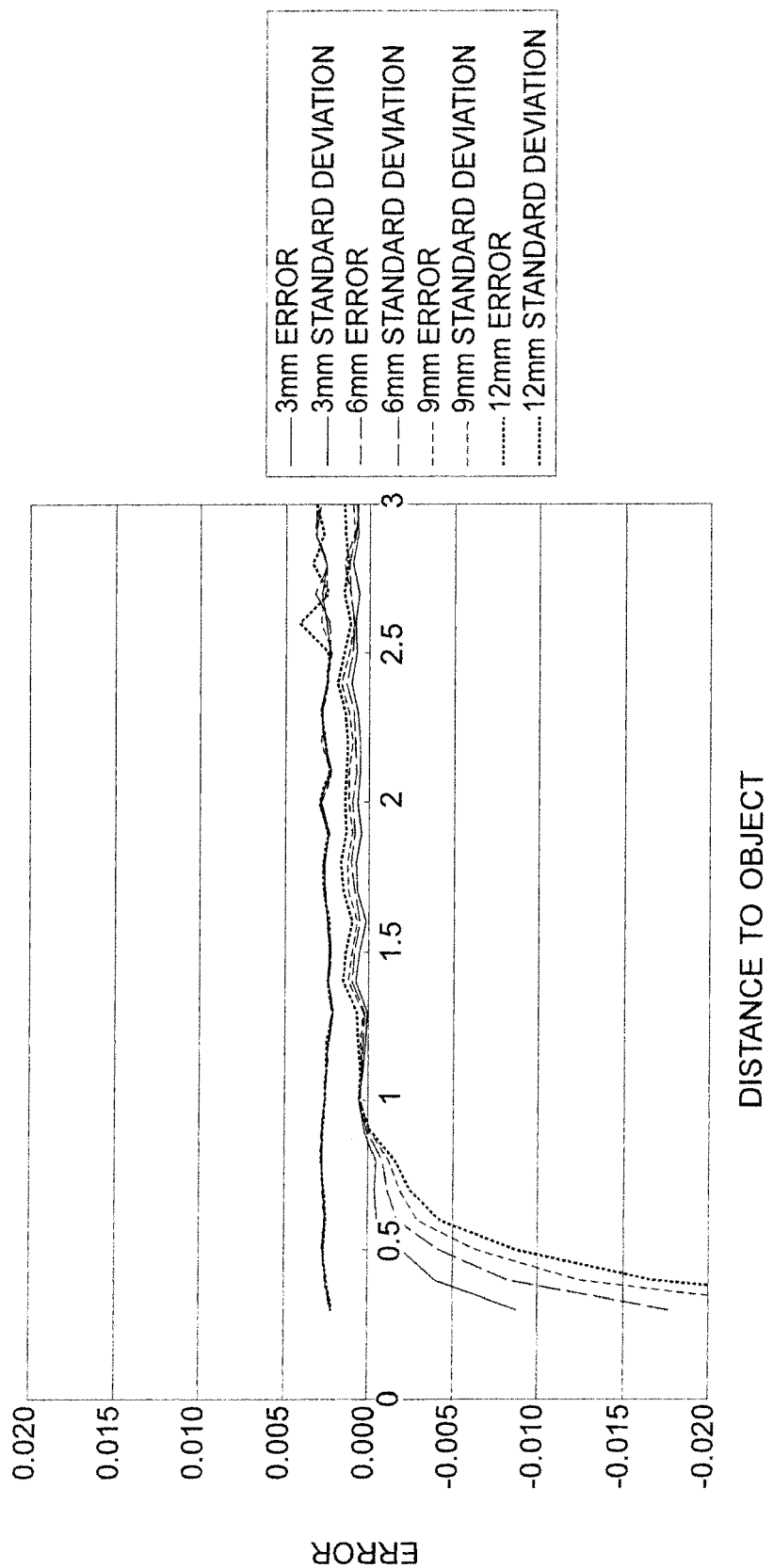
FIG. 8 is a view illustrating an error that is generated when a position is detected without considering the non-pinhole characteristic of the camera while a plate glass is placed in front of a pinhole.

FIG. 8 is a view illustrating an error that is generated when the position is detected without considering the non-pinhole characteristic of the camera while the plate glass is placed in front of the pinhole. For example, the position M of a marker (point) on the object is located in the plane perpendicular to the Z-axis of FIG. 4 and at one of the four vertexes of a square which has one side of 0.1 meter and the diagonal lines of which intersect with each other on the Z-axis. The horizontal axis indicates a distance (in meters) in the Z-axis direction from the pinhole position (position of C) to the point M on the object of FIG. 4. The vertical axis indicates a normalized value (unit: 1/meter) in which the distance between the position of the point M on the object and the estimated position (position of M') is divided by the square of the distance in the Z-axis direction of FIG. 4, that is, a normalized error. At this point, the standard deviation indicates a dispersion of the normalized error. The data is calibrated at the distance of one meter in the Z-axis direction from the pinhole position (position of C) to the point M on the object.

A horizontal view angle of the camera is set at 90 degrees, a horizontal pixel is set at 640 pixels, and an aspect ratio is set at 1:1.

FIG. 8 illustrates errors when the glass plate has thicknesses t of 3 millimeters, 6 millimeters, 9 millimeters, and 12 millimeters. The normalized error is rapidly increased when the distance in the Z-axis direction from the pinhole position (position of C) to the point M on the object is smaller than one meter.

Figure 9:
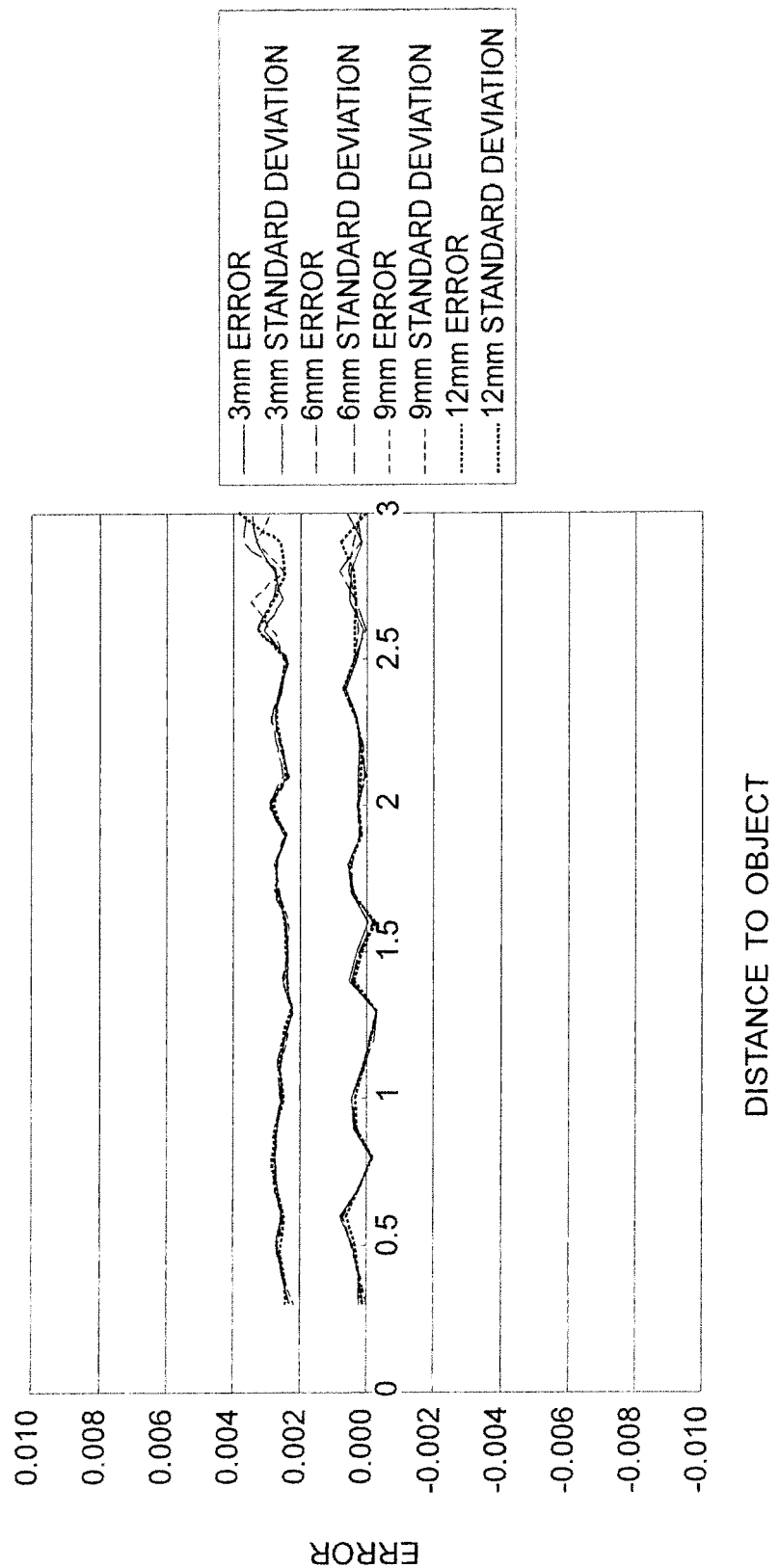
FIG. 9 is a view illustrating an error that is generated when the position is detected by a position detecting method of the invention on the same condition as that of FIG. 8.

FIG. 9 is a view illustrating an error that is generated when the position is detected by a position detecting method of the invention on the same condition as that of FIG. 8. The error is not increased even if the distance in the Z-axis direction from the pinhole position (position of C) to the point M on the object is smaller than one meter.

Thus, according to the position detecting method of the invention, the object position can be detected with high accuracy even if the object is located in the neighborhood.

The invention claimed is:

1. A position detecting method for detecting a position or an attitude of an object from measured pixel positions in an image of a plurality of points on the object in consideration of a non-pinhole characteristic of a camera, the image being taken with one camera, the plurality of points on the object being in a known positional relationship, the position detecting method comprising the steps of:

obtaining a position matrix indicating rotation and translation of the object from the measured pixel positions and a positional relationship between the plurality of points without considering the non-pinhole characteristic of the camera;

obtaining a corrected pixel position corresponding to one of the measured pixel positions in consideration of the non-pinhole characteristic of the camera;

adjusting the position matrix such that a distance between the corrected pixel position and the measured pixel position falls within an allowable range; and setting a position corresponding to the position matrix as the object position estimated in consideration of the non-pinhole characteristic of the camera, the position matrix being adjusted such that the distance between the corrected pixel position and the measured pixel position falls within an allowable range.

2. The position detecting method according to claim 1, wherein an element of the position matrix is adjusted so as to have orthogonality, the element expressing the rotation of the object.

3. The position detecting method according to claim wherein correction for the non-pinhole characteristic of the camera is performed using calibration data defined for each pixel position.

4. A position detecting apparatus that detects a position or an attitude of an object, the position detecting apparatus comprising:

image obtaining means for obtaining an image of a plurality of points on the object, the image being taken with one camera, the plurality of points being in a known positional relationship;

pixel position detecting means for detecting measured pixel positions of the plurality of points in the image; and object position estimating means for detecting the object position from the measured pixel positions of the plurality of points and a positional relationship between the plurality of points, the object position estimating means obtains a position matrix indicating rotation and translation of the object from the measured pixel position and a positional relationship between the plurality of points without considering the non-pinhole characteristic of the camera, obtains a corrected pixel position corresponding to one of the measured pixel positions in consideration of the non-pinhole characteristic of the camera, adjusts the position matrix such that a distance between the corrected pixel position and the measured pixel position falls within an allowable range, and sets a position corresponding to the position matrix as the object position estimated in consideration of the non-pinhole characteristic of the camera, the position matrix being adjusted such that the distance between the corrected pixel position and the measured pixel position falls within an allowable range.

5. The position detecting apparatus according to claim 4, further comprising calibration data storage means in which calibration data defined for each pixel position is stored, the object position estimating means performs correction for the non-pinhole characteristic of the camera using the calibration data.

* * * * *